UNITED STATES PATENT OFFICE.

GILMAN HOOK, OF HARWICH, MASSACHUSETTS, ASSIGNOR TO HIMSELF AND SULLIVAN W. ROGERS, OF SAME PLACE.

IMPROVEMENT IN RUBBER ELASTIC VARNISH.

Specification forming part of Letters Patent No. 123,020, dated January 23, 1872.

*To all whom it may concern:*

Be it known that I, GILMAN HOOK, of Harwich, in the county of Barnstable and State of Massachusetts, have invented an Improved composition of matter to be known as Rubber Elastic Varnish; and I do hereby declare that the following is a full and clear description thereof, and of the manner of producing and using the same, to wit:

Cut crude rubber into minute strips or particles, place about four ounces of said strips or particles of rubber in one gallon of boiled linseed-oil, and then agitate the same constantly or at intervals, until the rubber placed therein shall be dissolved and incorporated with the oil. The proportion of rubber to be dissolved in each gallon of oil must be varied to suit the quality of the oil employed, and also the use to which the varnish is to be applied. If it should be preferred by the manufacturer, the rubber may be first dissolved in raw linseed-oil, and afterward the mixture thus produced may be subjected to the desired boiling process.

My improved rubber elastic varnish may be applied to the surface of any fabric or other article by the aid of a brush; or the fabric, if sufficiently flexible, may be first dipped into the varnish and then, after removing the surplus varnish therefrom by passing the same between smooth compressing-rollers, its surface or surfaces may be smoothly polished by the aid of a brush and a small additional quantity of the rubber elastic varnish.

I am aware that a varnish has been produced by dissolving rubber in "drying-oil"—that is to say, an oil boiled with litharge; and therefore do not claim that as a part of my invention.

I claim as my invention—

A new composition of matter, to be known as rubber elastic varnish, said composition consisting of rubber and boiled linseed-oil incorporated with each, substantially as herein set forth.

In testimony that the aforegoing is a true and exact specification of the new composition of matter which I term rubber elastic varnish, I hereby subscribe my name this 2d day of October, 1871.

GILMAN HOOK.

Witnesses:
SULLIVAN W. ROGERS,
H. W. HOLMES.